US00RE46020E

(19) United States
(12) Reissued Patent
Ryu et al.

(10) Patent Number: US RE46,020 E
(45) Date of Reissued Patent: May 31, 2016

(54) METHOD OF CONTROLLING POINTER IN MOBILE TERMINAL HAVING POINTING DEVICE

(71) Applicant: SAMSUNG ELECTRONICS CO., LTD., Suwon-si (KR)

(72) Inventors: Dong Seok Ryu, Seoul (KR); Nho Kyung Hong, Seoul (KR); Jae Joon Hwang, Singapore (SG); Myoung Hwan Han, Seoul (KR)

(73) Assignee: SAMSUNG ELECTRONICS CO., LTD., Suwon-si (KR)

(21) Appl. No.: 13/906,084

(22) Filed: May 30, 2013

Related U.S. Patent Documents

Reissue of:
(64) Patent No.: 8,044,932
Issued: Oct. 25, 2011
Appl. No.: 11/779,082
Filed: Jul. 17, 2007

(30) Foreign Application Priority Data

Aug. 22, 2008 (KR) ..... 10-2006-0079151

(51) Int. Cl.
*G06F 3/033* (2013.01)
*G06F 3/038* (2013.01)

(52) U.S. Cl.
CPC ..... *G06F 3/038* (2013.01)

(58) Field of Classification Search
CPC ..... G06F 3/0481; G06F 3/0482; G06F 3/048; G06F 3/038
USPC ..... 345/145, 156–178; 455/566, 556; 715/856–862, 840, 846, 810, 835–837, 715/763
See application file for complete search history.

(56) References Cited

U.S. PATENT DOCUMENTS 4,760,386 A * 7/1988 Heath et al. ..... 345/180
5,905,497 A * 5/1999 Vaughan et al. ..... 345/672

(Continued)

FOREIGN PATENT DOCUMENTS

EP 0249063 A2 12/1987
KR 102006002247 3/2006

(Continued)

OTHER PUBLICATIONS

European Patent Office, European Search Report dated Apr. 25, 2013, issued in corresponding EP Application No. 13001209.9-1960.

(Continued)

*Primary Examiner* — Christina Y Leung
(74) *Attorney, Agent, or Firm* — Sughrue Mion, PLLC

(57) ABSTRACT

Provided is a method of controlling a pointer, such as changing between a pointer mode for activating the pointer and a search key mode for deactivating the pointer, in a mobile terminal having a pointing device. The method of controlling a pointer includes detecting movement input by the pointing device; identifying whether the detected movement satisfies a condition of changing a display mode; if the detected movement satisfies a condition of changing a display mode, displaying the pointer by changing the current display mode to a pointer mode; identifying whether a specific key is input; and if the specific key is input, hiding the pointer by changing the current display mode to a search key mode. Additionally, if elapsed time measured after displaying the pointer exceeds a predetermined value, the display mode of the mobile terminal may automatically be changed to a search key mode.

15 Claims, 4 Drawing Sheets

(56) References Cited

U.S. PATENT DOCUMENTS

| | | | | |
|---|---|---|---|---|
| 6,005,550 | A * | 12/1999 | Vaughan et al. | 345/157 |
| 6,219,028 | B1 * | 4/2001 | Simonson | 715/862 |
| 6,452,587 | B1 * | 9/2002 | Nikom | 345/167 |
| 2002/0063740 | A1 * | 5/2002 | Forlenza et al. | 345/856 |
| 2002/0135565 | A1 * | 9/2002 | Gordon et al. | 345/169 |
| 2003/0016249 | A1 * | 1/2003 | Cuijpers et al. | 345/810 |
| 2003/0231164 | A1 * | 12/2003 | Blumer et al. | 345/159 |
| 2004/0113955 | A1 * | 6/2004 | Kosugi | 345/856 |
| 2005/0003851 | A1 | 1/2005 | Chrysochoos et al. | |
| 2005/0179656 | A1 * | 8/2005 | Shah-Nazaroff | 345/157 |
| 2005/0219209 | A1 * | 10/2005 | Fleck et al. | 345/157 |
| 2006/0061557 | A1 * | 3/2006 | Kyrola | 345/173 |
| 2006/0082549 | A1 * | 4/2006 | Hoshino et al. | 345/157 |
| 2006/0092136 | A1 * | 5/2006 | Nishimura et al. | 345/167 |
| 2006/0158428 | A1 * | 7/2006 | Lazaridis et al. | 345/157 |
| 2006/0250358 | A1 * | 11/2006 | Wroblewski | 345/157 |
| 2007/0178933 | A1 * | 8/2007 | Nelson | H04W 48/18 455/550.1 |

FOREIGN PATENT DOCUMENTS

| | | | |
|---|---|---|---|
| WO | 0026892 | A1 | 5/2000 |
| WO | 2006030057 | A1 | 3/2006 |

OTHER PUBLICATIONS

European Patent Office, European Search Report issued dated Apr. 25, 2013, in corresponding EP Application No. 07112532.5-1960/1892613.

* cited by examiner

METHOD OF CONTROLLING POINTER IN MOBILE TERMINAL HAVING POINTING DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a reissue of U.S. patent application Ser. No. 11/779,082, filed Jul. 17, 2007, and issued on Oct. 25, 2011 as U.S. Pat. No. 8,044,932 B2. The disclosure of U.S. patent application Ser. No. 11,779,082 is considered part of the disclosure of the instant application and is hereby incorporated by reference in its entirety.*

PRIORITY

This application claims priority under 35 U.S.C. §119(a) to an application entitled "METHOD OF CONTROLLING POINTER IN MOBILE TERMINAL HAVING POINTING DEVICE" filed in the Korean Intellectual Property Office on Aug. 22, 2006 and assigned Serial No. 2006-0079151, the contents of which are incorporated herein by reference.

BACKGROUND OF THE INVENTION

1. Field of the Invention

The present invention relates to a method of controlling a pointer in a mobile terminal having a pointing device, and more particularly, to a method of controlling a pointer, such as changing between a pointer mode for activating a pointer and a search key mode for deactivating the pointer, in a mobile terminal having a pointing device.

2. Description of the Prior Art

Computer input devices, such as a full alphanumeric keyboard and a mouse, are seldom used in a mobile terminal, such as a mobile phone and a Personal Digital Assistant (PDA), due to their limited space. A simple button-type keypad is generally used as an input device of the mobile terminal. However, the keypad has a limited number of buttons and movement of a focus or a cursor (hereinafter, "focus") being controlled in a display unit in response to a key input is limited also.

A touch screen, a scroll wheel, a touch pad, a trackball, and an optical jog wheel have been developed as input devices of the mobile terminal. Among these input devices, the touch pad, the trackball, and the optical jog wheel are pointing devices using a pointer similar to that of a mouse.

The pointing device controls movement of a pointer being displayed on a display unit according to a user input. The pointer may freely move with little restriction of a moving direction, unlike the restricted horizontal and vertical movement directions of a conventional focus. Therefore, the pointer correctly operates according to a user's intention and improves a user's convenience. However, the pointer may sometimes induce user confusion, because it may be used together with the conventional focus.

A display screen of the mobile terminal is much smaller than a monitor screen of a computer, and the focus and the pointer occupy a relatively large portion in the display screen of the mobile terminal. The pointer often covers a menu, content, or input characters displayed in the display screen of the mobile terminal, and thereby induces user inconvenience. Further, if the pointer and focus are displayed simultaneously in the display screen, visual confusion may be induced.

SUMMARY OF THE INVENTION

The present invention has been made in view of the above problems, and the present invention provides a method of controlling a pointer in a mobile terminal having a pointing device that provides user-oriented operation of the mobile terminal by using a pointer mode for activating a pointer and a search key mode for deactivating the pointer, thereby decreasing user confusion and inconvenience.

The present invention further provides a method of controlling a pointer in a mobile terminal having a pointing device that enables a simple change of a display mode between the pointer mode and the search key mode.

A method of controlling a pointer in a mobile terminal having a pointing device for controlling the pointer in a display unit includes detecting movement input by the pointing device; identifying whether the detected movement satisfies a condition of changing a display mode; if the detected movement satisfies a condition of changing a display mode, displaying the pointer by changing the current display mode to a pointer mode; identifying whether a specific key is input; and if the specific key is input, hiding the pointer by changing the current display mode to a search key mode.

The method of controlling a pointer further includes before identifying whether the detected pointer movement satisfies a condition of changing a display mode, identifying whether the current display mode is a search key mode. The method of controlling a pointer further includes after hiding the pointer, executing a function of the specific key. Preferably, hiding the pointer and executing the function of the specific key are performed simultaneously.

Preferably, the condition of changing a display mode is that a value of the detected pointer movement exceeds a predetermined value, or that the number of the detected movements exceeds a predetermined number within a predetermined period. The specific key is preferably a search key.

The method of controlling a pointer further includes starting time measurement while simultaneously displaying the pointer; identifying whether the measured elapsed time exceeds a predetermined value; and if the measured elapsed time exceeds a predetermined value, hiding the pointer by changing the current display mode to a search key mode. The method of controlling a pointer further includes identifying, after starting time measurement, whether a movement or a clicking of the pointer is detected by the pointing device; if a movement or a clicking of the pointer is detected by the pointing device, resetting the measured elapsed time; and restarting the time measurement.

A method of controlling a pointer in a mobile terminal having a pointing device for controlling the pointer in a display unit according to another exemplary embodiment of the present invention includes detecting movement input by the pointing device; identifying whether the current display mode is a search key mode; if the current display mode is a search key mode, identifying whether the detected movement satisfies a condition of changing a display mode; if the detected movement satisfies a condition of changing a display mode, displaying the pointer by changing the current display mode to a pointer mode; starting time measurement while simultaneously displaying the pointer; identifying whether the measured elapsed time exceeds a predetermined value;

and if the measured elapsed time exceeds a predetermined value, hiding the pointer by changing the current display mode to a search key mode.

The method of controlling a pointer further includes if the measured elapsed time does not exceed a predetermined value, identifying whether the search key is input; and if the search key is input, hiding the pointer by changing the current display mode to a search key mode and moving a focus simultaneously. The method of controlling a pointer may further include if the search key is not input, identifying whether a movement or a clicking of the pointer is detected by the pointing device; if a movement or a clicking of the pointer is detected by the pointing device, resetting the measured elapsed time; and restarting the time measurement.

In the method of controlling a pointer, the condition of changing a display mode is preferably that a value of the detected movement exceeds a predetermined value, or that the number of the detected movements exceeds a predetermined number within a predetermined period, or that a value of the detected movement exceeds a predetermined value and the number of the detected movements exceeds a predetermined number within a predetermined period.

BRIEF DESCRIPTION OF THE DRAWINGS

The objects, features and advantages of the present invention will become more apparent from the following detailed description in conjunction with the accompanying drawings, in which.

DETAILED DESCRIPTION OF EXEMPLARY EMBODIMENTS

Hereinafter, exemplary embodiments of the present invention are described in detail with reference to the accompanying drawings. The same reference numbers are used throughout the drawings. Detailed descriptions of constructions or processes known in the art may be omitted to avoid obscuring the subject matters of the present invention.

A mobile terminal applied to the present invention is a small portable electronic device for providing functions of information processing, telecommunication, and entertainments. For example, the mobile terminal may be a mobile phone, a Personal Digital Assistant (PDA), an MP3 player, a Portable Multimedia Player (PMP), a Digital Multimedia Broadcasting (DMB) receiver, and a car navigator. Any mobile terminal and electronic device having the above functions may be applied to the present invention.

The mobile terminal may include a pointing device as an input unit in addition to a conventional key input unit having a search key. The pointing device is a kind of input unit for detecting movement of a user's finger and controlling a pointer correspondingly, such as an optical jog wheel, a touch pad, and a trackball. The pointing device is preferably formed in the center of a search key (or navigation key) for user convenience. However, the present invention is not limited thereto. The pointing device may be formed with another key or with a function key. The pointing device may be formed in the whole area of the keypad as with a touchpad. In the case that the pointing device is formed with a conventional key input unit having no function key, the conventional key input unit may perform both its intended function and a pointing function.

Figure 1:
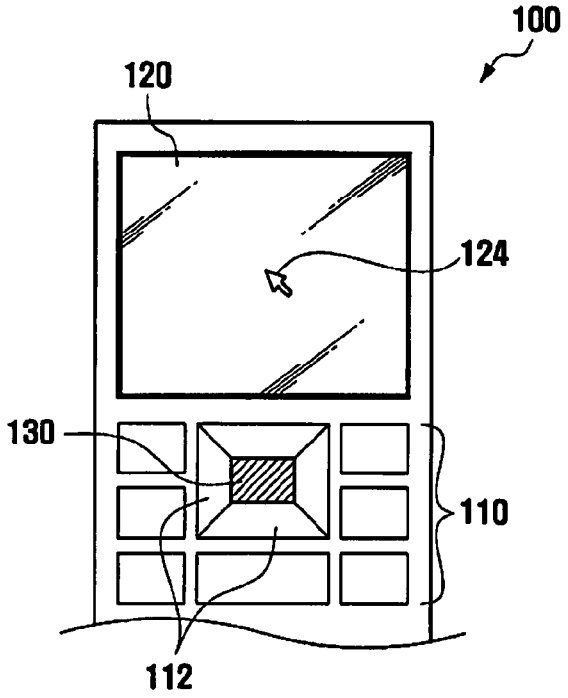
FIG. 1 is a schematic view of a mobile terminal having a pointing device and a pointer according to the present invention.
Figure 2:
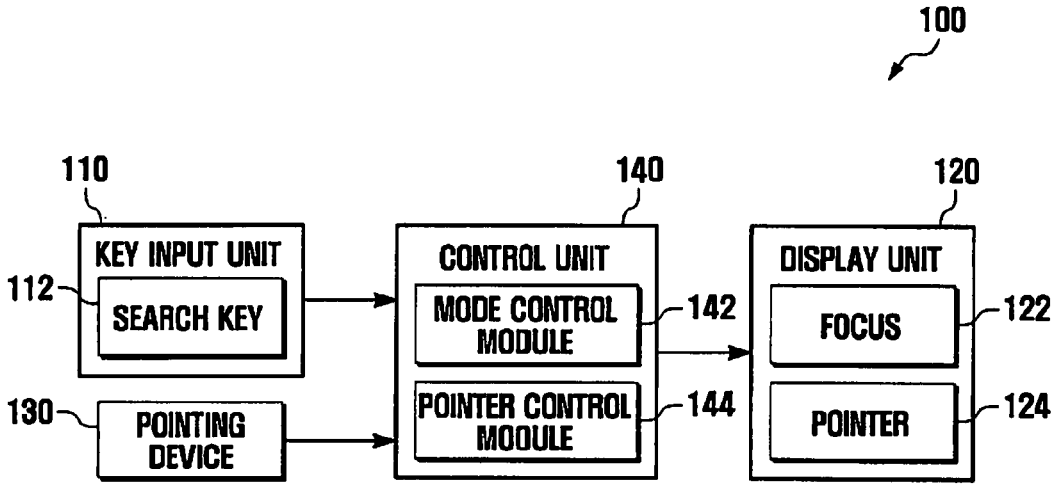
FIG. 2 is a block diagram showing a configuration of a mobile terminal according to the present invention.

FIG. 1 is a schematic view of a mobile terminal having a pointing device and a pointer according to the present invention. FIG. 2 is a block diagram showing a configuration of a mobile terminal according to the present invention.

Referring to FIGS. 1 and 2, the mobile terminal 100 includes a key input unit 110, a display unit 120, a pointing device 130, and a control unit 140.

The key input unit 110 is formed with various keys including a search key 112. The search key 112 receives a user input to control movement of a focus 122 displayed in the display unit 120. The movement of the focus 122 using a search key 112 is limited to four directions (right/left/up/down) or to two directions (right/left or up/down). The search key 112 may have a function of changing a display mode from a pointer mode to a search key mode in addition to its intended function of changing a moving direction of the focus 122.

The display unit 120 displays various menus, applications, and contents in relation to operation of the mobile terminal 100, and provides various input and output screens. In particular, the display unit 120 includes the focus 122 and a pointer 124. The focus 122 and the pointer 124 are used for entering, executing, and selecting a specific menu, an application, and content, and may indicate a position of inputting data. The focus 122 is activated and displayed in most screens. However, the pointer 124 is activated and displayed in a screen of the display unit 120 only when the current display mode is a pointer mode, and is deactivated and hidden from the screen of the display unit 120 when the current display mode is a search key mode. The pointer 124 may be set to change its display form or to execute animation according to various situations.

The pointing device 130, such as an optical jog wheel, is formed with a center key surrounded by search keys 112, as in a conventional keypad. The technology of forming the pointing device 130 by replacing a portion of the conventional keys is well known in the art. In the pointer mode, the pointer 124 may move in the display unit 120 corresponding to movement of a user's finger sliding on the pointing device 130, and entering, executing, and selecting a function may be performed by clicking the pointing device 130 at a desired position of the pointer 124. Although the pointer mode has been changed to the search key mode, the function of the center key may still be used in the same way. That is, if the user clicks the pointing device 130 in a search key mode, the center key performs its intended function of a confirmation key or a connection key for connecting to a service provider.

The control unit 140 controls general operation of the mobile terminal 100. In particular, the control unit 140 includes a mode control module 142 and a pointer control module 144. The mode control module 142 identifies the current display mode and a condition of changing a display mode corresponding to an input signal. The pointer control module 144 controls movement of the pointer 124 and displays or hides the pointer 124 corresponding to an input signal satisfying the condition of changing a display mode. Detailed conditions of changing a display mode are described later.

Figure 3:
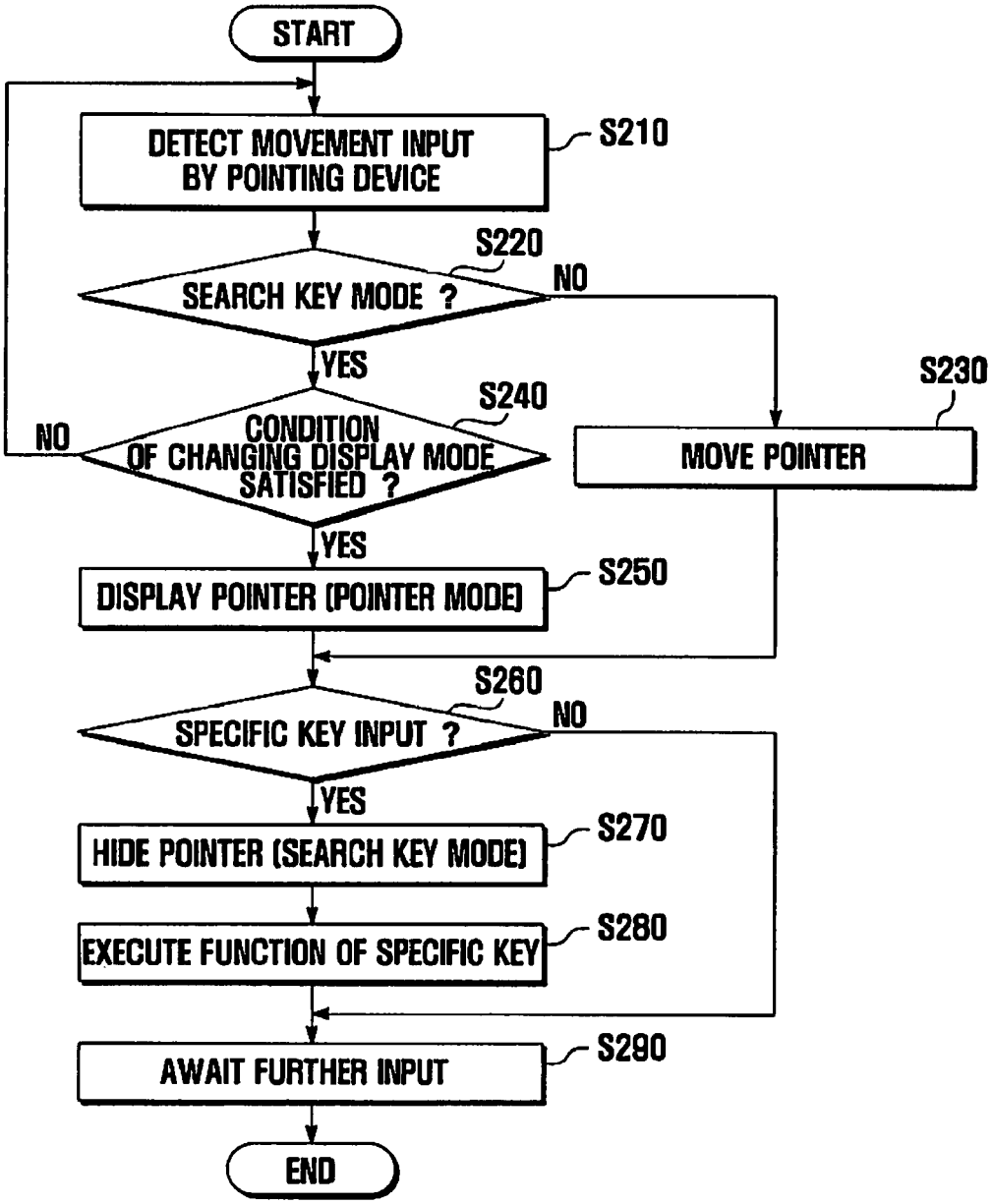
FIG. 3 is a flow chart showing a method of controlling a pointer in a mobile terminal according to an exemplary embodiment of the present invention.

FIG. 3 is a flow chart showing a method of controlling a pointer in a mobile terminal according to an exemplary embodiment of the present invention, and the pointer control method is described referring to FIGS. 2 and 3.

The pointing device 130 detects movement of a user's finger, converts the movement to an electric signal, and outputs the electric signal to the control unit 140, in Step S210. A method of detecting the movement and converting to an electric signal may vary according to the type of the pointing device 130, however the technology of this method is well known in the art, and therefore detailed description is omitted here.

If the pointing device 130 detects the movement of a user's finger, the mode control module 142 of the control unit 140 identifies whether the current display mode is a search key mode, in Step S220. In the search key mode, only the focus 122 is displayed in the display unit 120 and the pointer 124 is not displayed. In the pointer mode, the pointer 124 is displayed in the display unit 120 and the focus 122 is generally also displayed. However, the focus may not be displayed in some instances of the pointer mode.

If the current display mode is not a search key mode (i.e. if the current display mode is a pointer mode), the pointer control module 144 moves the pointer 124 corresponding to the values (for example, direction and distance) of the movement detected by the pointing device 130, in Step S230.

If the current display mode is a search key mode, the mode control module 142 identifies whether the movement detected by the pointing device 130 satisfies a condition of changing a display mode, in Step S240. The condition of changing a display mode may be set in various manners. However, the condition of changing a display mode must distinguish movement intended by the user for changing a display mode from other movement generated in normal operation. That is, the movement of a user's finger generated in normal operation must not be identified as an intention of changing a display mode.

If a condition of changing a display mode is not satisfied, the process returns to Step S210 and the control unit 140 detects movement of a user's finger again through the pointing device 130.

If a condition of changing a display mode is satisfied, the pointer control module 144 displays the pointer 124 in the display unit 120 by activating the pointer 124, and changes the current display mode to a pointer mode, in Step S250. The activation of the pointer 124 may be indicated as a slow appearance of the pointer 124 in the display unit 120.

After changing the current display mode to a pointer mode at Step S250, or after moving the pointer in a pointer mode at Step 230, the control unit 140 identifies whether a specific key is input by the key input unit 110, in Step S260. The specific key is a normal key or a function key assigned with a command for changing a pointer mode to a search key mode. For user convenience, the specific key is preferably formed close to the pointing device 130.

If a specific key is not input by the key input unit 110, the control unit 140 awaits further key input for operating the mobile terminal 100, in Step S290.

If a specific key is input by the key input unit 110, the pointer control module 144 hides the pointer 124 by deactivating the pointer 124 and changes the current display mode to a search key mode, in Step S270. The deactivation of the pointer 124 may be indicated as a sudden disappearance of the pointer 124 from the display unit 120.

According to the input of the specific key, the control unit 140 executes a native function of the specific key at the same time as hiding the pointer 124, in Step S280. That is, both changing a display mode and executing a function of the specific key are performed with a single key input, without a need to input two keys separately. The control unit 140 then awaits further key input for operating the mobile terminal 100 at Step S290.

Figure 4A:
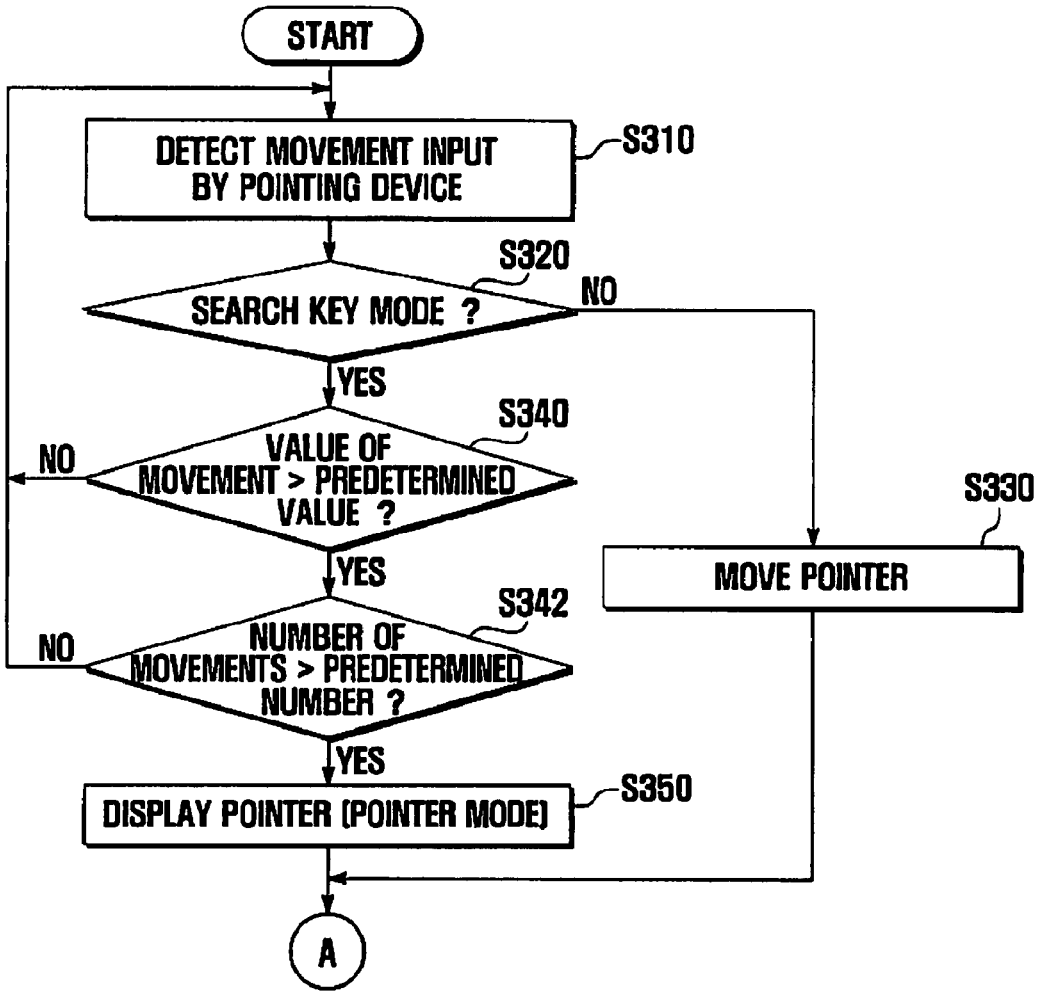
FIGS. 4A and 4B are flow charts showing a method of controlling a pointer in a mobile terminal according to another exemplary embodiment of the present invention.
Figure 4B:
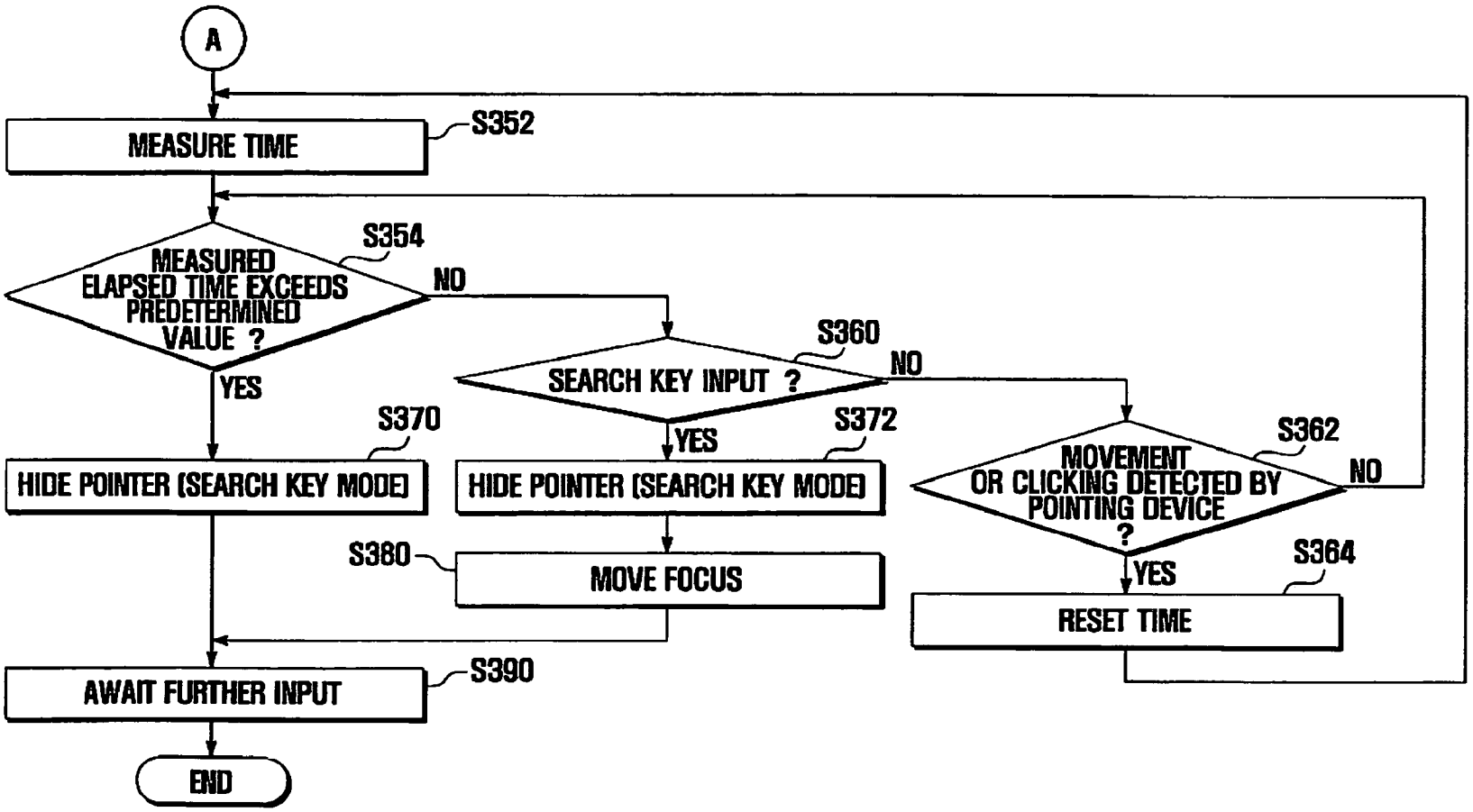

FIGS. 4A and 4B are flow charts showing a method of controlling a pointer in a mobile terminal according to another exemplary embodiment of the present invention.

In FIG. 4A, steps of detecting movement of a user's finger by the pointing device 130, in Step S310; identifying whether the current display mode is a search key mode, in Step S320; and if the current display mode is not a search key mode, moving the pointer 124, in Step S330, are identical respectively to Steps S210, S220, and S230 of FIG. 3, and therefore are not further detailed herein.

If the current display mode is a search key mode, the mode control module 142 identifies whether a value of movement detected by the pointing device 130 exceeds a predetermined value, in Step S340. The value of movement may be measured as a distance expressed by number of pixels (for example, 3 pixels).

If the value of movement exceeds a predetermined value, the mode control module 142 identifies whether the number of movements exceeds a predetermined number, in Step S342. For example, the mode control module 142 identifies whether the number of subsequent movements exceeds a predetermined number '5'. As another example, the mode control module 142 detects the movement periodically (for example, at 25 ms intervals) and identifies whether the number of movements exceeds a predetermined number (for example, 4) in a predetermined period (for example, within 0.1 seconds). The above examples are only for easier understanding, and the present invention is not limited thereto.

If the number of movements exceeds a predetermined number at Step S342, that is, if the conditions of changing a display mode are satisfied both at Steps S340 and S342, the pointer control module 144 displays the pointer 124 in the display unit 120 and changes the current display mode to a pointer mode, in Step S350. In another exemplary embodiment of the present invention, a new step replaces the Steps S340 and S342, such that if either of the conditions of the Steps S340 and S342 is satisfied in the new step, the condition of changing a display mode may be set such that the current display mode is changed.

The mode control module 142 starts to measure time while simultaneously changing the current display mode to a pointer mode and displaying the pointer 124, in Step S352, and identifies whether the measured elapsed time exceeds a predetermined value, in Step S354. For example, the predetermined value may be set to 5 seconds.

If the measured elapsed time exceeds a predetermined value, the pointer control module 144 hides the pointer 124 by deactivating the pointer 124 and changes the current display mode to a search key mode, in Step S370. Subsequently, the control unit 140 awaits further input for operating the mobile terminal 100, in Step S390.

If the measured elapsed time does not exceed a predetermined value at Step S354, the control unit 140 identifies whether the search key 112 is input through the key input unit 110, in Step S360.

If the search key 112 is input, the pointer control module 144 hides the pointer 124 by deactivating the pointer 124 and changes the current display mode to a search key mode, in Step S372. If the measured elapsed time exceeds a predetermined value is an automatic change function changing the current display mode to a search key mode, and changing the current display mode to a search key mode according to an input of the search key 112 is a forced change function of a display mode.

If the user inputs the search key 112 in a pointer mode, after hiding the pointer 124 and changing the current display mode to a search key mode, the control unit 140 moves a focus as a native function of the search key 112, in Step S380. Accordingly, the user does not need to perform one operation for changing the display mode and another separate operation for moving a focus.

If the search key 112 is not input at Step S360, the control unit 140 identifies whether another signal (i.e. a pointer movement or clicking) is input through the pointing device 130, in Step S362.

If a movement or a clicking of the pointer 124 is input through the pointing device 130, the control unit 140 resets the measured elapsed time, in Step S364, and restarts time measurement at Step S352. If a movement or a clicking of the pointer 124 is not input through the pointing device 130 at Step S362, the mode control module 142 continues to identify whether the measured elapsed time exceeds a predetermined value at Step 354. That is, the automatic change function is performed only when movement is not detected by the pointing device 130 and the search key 112 is not input. The time measurement restarts whenever movement is detected by the pointing device 130, and the current display mode is changed to a search key mode if the search key 112 is input.

The method of controlling a pointer in a mobile terminal having a pointing device according to the present invention provides user-oriented operation of the mobile terminal and decreases user confusion and inconvenience by changing a display mode between a pointer mode for activating a pointer and a search key mode for deactivating the pointer. The pointer is displayed only when a user needs to use the pointer, and thereby confusion and inconvenience due to displaying both pointer and focus may be avoided.

The method of controlling a pointer according to the present invention provides a simple change of a display mode between a pointer mode and a search key mode by changing the current display mode to a pointer mode corresponding to movement detected by the pointing device and by changing the current display mode to a search key mode corresponding to an input of a specific key such as a search key. User convenience may further be increased by using a forced and an automatic change in a function of a display mode.

The method of controlling a pointer in a mobile terminal according to the present invention increases reliability of changing a display mode by distinguishing movement intended by the user for changing a display mode from other movement generated in normal operation.

The method of controlling a pointer in a mobile terminal according to the present invention enables both changing a display mode and executing a function of a specific key with a single key input, without having to input two keys separately.

Although exemplary embodiments of the present invention have been described in detail hereinabove, it should be understood that many variations and modifications of the basic inventive concept herein described, which may appear to those skilled in the art, will still fall within the spirit and scope of the present invention as defined in the appended claims.

What is claimed is:

[1. A method of controlling a pointer in a mobile terminal having a pointing device for controlling a pointer in a display unit, the method comprising:

detecting movement input by the pointing device;

identifying whether the detected movement satisfies a condition of changing a display mode;

if the detected movement satisfies a condition of changing the display mode, displaying the pointer by changing a current display mode to a pointer mode;

identifying whether a specific key is input; and if the specific key is input, hiding the pointer by changing the current display mode to a search key mode, wherein the condition of changing a display mode is that a number of the detected movements exceeds a predetermined number greater than one within a predetermined period.]

[2. The method of claim 1, further comprising identifying, before identifying whether the detected movement satisfies a condition of changing a display mode, whether the current display mode is the search key mode.]

[3. The method of claim 1, further comprising, after hiding the pointer, executing a function of the specific key.]

[4. The method of claim 3, wherein hiding the pointer and executing the function of the specific key are performed simultaneously.]

[5. The method of claim 1, wherein the condition of changing a display mode is that a value of the detected movement exceeds a predetermined value.]

[6. The method of claim 1, wherein the specific key is a search key.]

[7. The method of claim 1, further comprising:

starting a measurement of an elapsed time while simultaneously displaying the pointer;

identifying whether the measured elapsed time exceeds a predetermined value; and if the measured elapsed time exceeds a predetermined value, hiding the pointer by changing the current display mode to the search key mode.]

[8. The method of claim 7, further comprising:

identifying, after starting the time measurement, whether a movement or a clicking of the pointer is detected by the pointing device;

if the movement or the clicking of the pointer is detected by the pointing device, resetting the measured elapsed time; and restarting the time measurement.]

[9. A method of controlling a pointer in a mobile terminal having a pointing device for controlling the pointer in a display unit, the method comprising:

detecting movement input by the pointing device;

identifying whether a current display mode is a search key mode;

if the current display mode is the search key mode, identifying whether the detected movement satisfies a condition of changing the display mode;

if the detected movement satisfies a condition of changing the display mode, displaying the pointer by changing the current display mode to a pointer mode;

starting a measurement of an elapsed time while simultaneously displaying the pointer;

identifying whether the measured elapsed time exceeds a predetermined value; and if the measured elapsed time exceeds a predetermined value, hiding the pointer by changing the current display mode to the search key mode, wherein the condition of changing a display mode is that the number of the detected movements exceeds a predetermined number greater than one within a predetermined period.]

[10. The method of claim 9, further comprising:

if the measured elapsed time does not exceed a predetermined value, identifying whether the search key is input; and if the search key is input, hiding the pointer by changing the current display mode to the search key mode and moving a focus simultaneously.]

[11. The method of claim 10, further comprising:

if the search key is not input, identifying whether a movement or a clicking of the pointer is detected by the pointing device;

if movement or clicking of the pointer is detected by the pointing device, resetting the measured elapsed time; and restarting the time measurement.]

[12. The method of claim 9, wherein the condition of changing a display mode is that a value of a detected movement exceeds a predetermined value.]

[13. The method of claim 9, wherein the condition of changing a display mode is that a value of the detected movement exceeds a predetermined value and the number of the detected movements exceeds a predetermined number within a predetermined period.]

*14. A method of controlling a pointer displayed in a display unit, comprising:*

*receiving movement information from a movement information generating unit;*

*in response to receiving the movement information while the electronic apparatus operates in a non-pointing mode, determining whether the received movement information satisfies a predefined condition, the predefined condition being based on a number of movements indicated by the received movement information;*

*changing, when the received movement information satisfies the predefined condition, an operation mode from the non-pointing mode to a pointing mode in which a pointer is displayed on the display unit and a position of the pointer displayed on the display unit is determined based on the received movement information;*

*receiving information associated with a selected button while in the pointing mode; and*

*in response to the received information regarding the selected button, if the selected button is a first button, processing a function corresponding to the first button while remaining in the pointing mode, and if the selected button is a second button for controlling movement of a focus for indicating a selected item displayed in the display unit, changing the operation mode from the pointing mode to the non-pointing mode and processing a function corresponding to the received information, and causing the pointer to not be displayed in response to the second button being selected,*

*wherein the predefined condition for changing the operation mode from the non-pointing mode to the pointing mode is that the movement information received from the movement information generating unit indicates that a number of movements exceeds a predetermined number greater than one within a predetermined period.*

*15. The method of claim 14, further comprising:*

*changing from the non-pointing mode to the pointing mode based on information generated in the movement information generating unit while in the non-pointing mode.*

*16. The method of claim 14, wherein the movement information generating unit is a pointing device.*

*17. The method of claim 14, wherein the function corresponding to the first button is one of a movement and a clicking of the pointer and the function corresponding to the second button is a movement of a focus displayed in the display unit.*

*18. The method of claim 14, wherein in response to the change from the pointing mode to the non-pointing mode, a focus for indicating a selected item is displayed and the pointer disappears from the display unit.*

*19. The method of claim 14, wherein a control unit is configured to change the operation mode from the pointing mode to the non-pointing mode when no movement is detected for a predetermined amount of time in the pointing mode.*

*20. The method of claim 14, wherein the predefined condition for changing the operation mode from the non-pointing mode to the pointing mode is that a value of the received movement information exceeds a predetermined value.*

*21. An electronic apparatus, comprising:*

*a display unit; and*

*a control unit configured, in response to receiving movement information while the electronic apparatus operates in a non-pointing mode, to determine whether the received movement information satisfies a predefined condition, the predefined condition being based on a number of movements indicated by the received movement information, and when the received movement information satisfies the predefined condition, to control to change an operation mode from the non-pointing mode to a pointing mode in which a pointer is displayed on the display unit and a position of a pointer displayed on the display unit is determined based on the received movement information,*

*wherein in response to receiving information associated with selection of a first button while in the pointing mode, the control unit is configured to process a function corresponding to the first button while remaining in the pointing mode, and in response to receiving information associated with selection of a second button for controlling of movement of a focus for indicating a selected item displayed in the display unit, the control unit is configured to change the operation mode from the pointing mode to the non-pointing mode and process a function corresponding to the received information, and to cause the pointer to not be displayed in response to the second button being selected,*

*wherein the predefined condition for changing the operation mode from the non-pointing mode to the pointing mode is that the received movement information indicates that a number of movements exceeds a predetermined number greater than one within a predetermined period.*

*22. The electronic apparatus of claim 21, wherein the control unit is further configured to receive the movement information from a movement information generating unit, the information associated with selection of the first button and the information associated with selection of the second button.*

*23. The electronic apparatus of claim 21, wherein the control unit is configured to change from the non-pointing mode to the pointing mode based on information generated in the movement information generating unit while in the non-pointing mode.*

*24. The electronic apparatus of claim 21, wherein the movement information generating unit is a pointing device.*

*25. The electronic apparatus of claim 21, wherein the function corresponding to the first button is one of a movement and a clicking of the pointer and the function corresponding to the second button is a movement of a focus displayed in the display unit.*

*26. The electronic apparatus of claim 21, wherein in response to the change from the pointing mode to the non-pointing mode, the focus for indicating a selected item is displayed and the pointer disappears from the display unit.*

*27. The electronic apparatus of claim 21, wherein the control unit is configured to change the operation mode from the pointing mode to the non-pointing mode when no movement is detected for a predetermined amount of time in the pointing mode.*

*28. The electronic apparatus of claim 21, wherein the predefined condition for changing the operation mode from the non-pointing mode to the pointing mode is that a value of the received movement information exceeds a predetermined value.*

* * * * *